UNITED STATES PATENT OFFICE 2,119,891

NITROSAMINES

Wilhelm Seidenfaden and Hans Thomae, Offenbach-on-the-Main, Germany, assignors to General Aniline Works, Inc., New York, N. Y., a corporation of Delaware No Drawing. Application August 3, 1937, Serial No. 157,226. In Germany August 7, 1936

4 Claims. (Cl. 260—69)

The present invention relates to nitrosamines, more particularly it relates to compounds of the following general constitution:

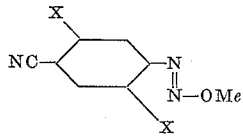

wherein Me stands for an alkali metal and the X's stand for substituents with the exception of hydroxyl and groups that lend solubility, such as sulfonic acid and carboxylic acid groups.

The nitrosamines are obtainable by transforming the diazonium compound of a 1-amino-4-nitrilobenzene corresponding with the above constitution by treating it with an alkali in a manner known to be available for a like transformation in other cases.

According to the more or less negative character of the substituent or substituents that kind of the known general method is applied which appears to be the most suitable, for instance the diazo-compound is directly transformed into the nitrosamine by the action of strong alkali; it is also possible first to prepare the syndiazotate and then to transpose it to the antidiazotate, according to the requirements, with or without application of heat. The most favorable conditions may in each case easily be ascertained by a preliminary test.

It is surprising and could not be foreseen that such nitrosamines can be made in a smooth reaction without saponification of the nitrilo-group.

The new nitrosamines are valuable intermediates for the manufacture of dyestuffs.

The following examples serve to illustrate the invention, but they are not intended to limit it thereto; the parts are by weight:

1. 16.7 parts of finely powdered 1-amino-5-methyl-2-chloro-4-nitrilobenzene (obtainable by diazotizing the 1-amino-2-methyl-5-chloro-4-nitrobenzene described in "Chemisches Zentralblatt", 1926, Vol. I, page 897, exchanging the diazo group for the nitrilo group according to the reaction of Sandmeyer and reducing the 1-nitrilo-2-methyl-5-chloro-4-nitrobenzene thus obtained) are made into a paste with 112 parts of water and 30 parts of concentrated hydrochloric acid and diazotized at 15° C.–20° C. with a solution of 7.2 parts of sodium nitrite in 15 parts of water. The filtered diazo-solution is introduced drop by drop at 0° C.–5° C., while well stirring, into a solution of 145 parts of potassium hydroxide in 200 parts of water. The syndiazo-compound thus formed precipitates in part. By introducing 35 parts of potassium hydroxide and heating the mass to 60° C.–70° C. the transformation into the nitrosamine occurs. The nitrosamine separates on cooling. It is further treated, or stored advantageously in the form of the paste which is obtained by filtering and pressing it.

2. 21.5 parts of 1-amino-2,5-dimethoxy-4-nitrilobenzene hydrochloride (obtainable by diazotizing the 1-amino-2,5-dimethoxy-4-nitrobenzene described in German Patent No. 141,398, page 1, lines 1–10, exchanging the diazo group for the nitrilo group according to the reaction of Sandmeyer and reducing the 1-nitrilo-2,5-dimethoxy-4-nitrobenzene thus obtained) are made into a paste with 30 parts of concentrated hydrochloric acid and 200 parts of water and diazotized in the usual manner. The filtered yellow diazo-solution is introduced drop by drop at 0° C.–10° C., while well stirring, into a solution of 140 parts of caustic soda in 200 parts of water. The syndiazotate thus produced is transformed into the sodium compound of the nitrosamine by addition of 200 parts of caustic soda and heating for a short time to 60° C.–70° C. After precipitating and pressing, the nitrosamine is obtained with a good yield in the form of a light-yellow paste readily soluble in water.

3. 18.3 parts of 1-amino-2-methoxy-5-chloro-4-nitrilobenzene (obtainable by diazotizing the 1-amino-5-methoxy-2-chloro-4-nitrobenzene described in German Patent No. 216,417, exchanging the diazo group for the nitrilo group according to the reaction of Sandmeyer and reducing the 1-nitrilo-5-methoxy-2-chloro-4-nitrobenzene thus obtained) are made into a paste with 20 parts of glacial acetic acid, 20 parts of concentrated hydrochloric acid and 20 parts of water and diazotized with a solution of 7 parts of sodium nitrite in 20 parts of water, while feebly cooling. After dilution with 150 parts of water the whole is filtered and the diazo-solution is introduced drop by drop at 0° C. into a solution of 120 parts of caustic potash in 400 parts of water. The syndiazo-compound thus obtained is transposed by adding to the mass 280 parts of caustic potash and heating to 50° C.–70° C. The product is worked up and the nitrosamine is obtained in the form of a light-brown paste.

The transformation may also be effected by introducing the syndiazo-solution at 50° C.–60° C. into a caustic potash solution of a suitable concentration.

4. A diazo-solution of 1-amino-2-methoxy-5-chloro-4-nitrilobenzene made as described in the preceding example is introduced drop by drop at 50° C.–60° C. into a solution of 240 parts of caustic potash in 400 parts of water. The nitrosamine separates in the form of a light-brown finely crystalline product.

5. 14.2 parts of 1-amino-5-methoxy-2-diethylaminosulfonyl-4-nitrilobenzene (obtainable by diazotizing the 1-amino-2-methoxy-4-nitro-5-diethylaminosulfonylbenzene described in Example 1, line 73, of French Patent No. 782,126, exchanging the diazo group for the nitrilo group according to the reaction of Sandmeyer and reducing the 1-nitrilo-2-methoxy-4-nitro-5-diethylaminosulfonylbenzene thus obtained) are made into a paste with 20 parts of glacial acetic acid, 15 parts of concentrated hydrochloric acid and 10 parts of water and diazotized in the usual manner. The whole is made up with water to 150 parts by volume and filtered. The diazosolution is introduced drop by drop at 0° C.–10° C., while well stirring, into a solution of 100 parts of caustic potash in 300 parts of water. The nitrosamine separates in the form of a semisolid yellow-brown mass which solidifies after some time and may then be freed from the adherent caustic alkali solution by centrifuging.

In an analogous manner other nitrilo-compounds having the constitution indicated by the above formula may be transformed into the corresponding nitrosamines, for instance, 1-amino-2-methyl-5-chloro-4-nitrilobenzene, 1-amino-5-methyl-2-bromo-4-nitrilobenzene, 1-amino-5-ethyl-2-chloro-4-nitrilobenzene, 1-amino-5-methoxy-2-chloro-4-nitrilobenzene, 1-amino-5-ethoxy-2-chloro-4-nitrilobenzene, 1-amino-2-phenoxy-5-chloro-4-nitrilobenzene, 1-amino-5-methoxy-2-trifluoromethyl-4-nitrilobenzene, 1-amino-5-methyl-2-diethylaminosulfonyl-4-nitrilobenzene, 1-amino-5-methyl-2-methylsulfonyl-4-nitrilobenzene, 1-amino-5-methyl-2-butylsulfonyl-4-nitrilobenzene, 1-amino-2-methoxy-5-dimethylaminosulfonyl-4-nitrilobenzene, 1-amino-2,5-diethoxy-4-nitrilobenzene, 1-amino-2,5-dimethyl-4-nitrilobenzene, 1-amino-2,5-dichloro-4-nitrilobenzene and 1-amino-2-methyl-5-methoxy-4-nitrilobenzene.

We claim:

1. The compounds of the following general formula:

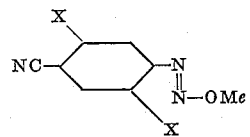

wherein M*e* stands for an alkali metal and the X's stand for members of the group consisting of halogen, alkyl, alkoxy, phenoxy, trifluoromethyl, alkylsulfonyl and dialkylaminosulfonyl, being yellow to brown powders and yielding the corresponding diazonium compounds by the action of acids.

2. The compound of the following formula:

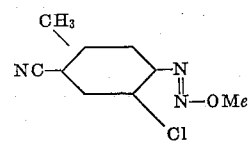

wherein M*e* stands for an alkali metal, being a yellow-brown powder.

3. The compound of the following formula:

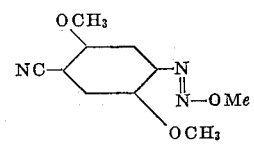

wherein M*e* stands for an alkali metal, being a light-yellow powder.

4. The compound of the following formula:

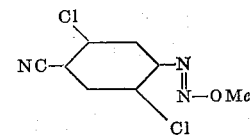

wherein M*e* stands for an alkali metal, being a yellowish powder.

WILHELM SEIDENFADEN.
HANS THOMAE.